United States Patent
Barry et al.

(10) Patent No.: US 7,451,246 B2
(45) Date of Patent: Nov. 11, 2008

(54) INDIRECTLY CONTROLLING A TARGET DEVICE ON A NETWORK

(75) Inventors: Timothy G Barry, Ft. Collins, CO (US); Harry Moeller, Domach-Aschheim (DE); Lothar Baum, Mahwah, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 11/406,242

(22) Filed: Apr. 19, 2006

(65) Prior Publication Data

US 2008/0005367 A1    Jan. 3, 2008

(51) Int. Cl.
G06F 3/00    (2006.01)
G06F 9/44    (2006.01)

(52) U.S. Cl. ............................ 710/14; 710/58; 717/178; 709/208

(58) Field of Classification Search ................ 710/5–19, 710/31–35, 58–60; 709/208–211; 717/168–178
See application file for complete search history.

(56) References Cited

U.S. PATENT DOCUMENTS

| 5,630,139 | A | * | 5/1997 | Ozaki | 717/167 |
|---|---|---|---|---|---|
| 7,062,718 | B2 | * | 6/2006 | Kodosky et al. | 715/771 |
| 7,069,553 | B2 | * | 6/2006 | Narayanaswamy et al. | 717/173 |
| 2003/0121032 | A1 | * | 6/2003 | Cho et al. | 717/173 |
| 2003/0135858 | A1 | * | 7/2003 | Nemoto | 725/75 |
| 2004/0068548 | A1 | * | 4/2004 | Sugita | 709/208 |
| 2005/0097543 | A1 | * | 5/2005 | Hirayama | 717/168 |
| 2006/0184619 | A1 | * | 8/2006 | Tano et al. | 709/203 |

* cited by examiner

Primary Examiner—Christopher B Shin

(57) ABSTRACT

Methods and systems are described for a system for transitioning a target device to a first operative state, such as a service operating system. The target device in the first operative state then receives a set of one or more instructions, and processes the received set of one or more instructions to perform a set of one or more operations with regard to an indirect target device. Further, after processing of the set of one or more instructions, the target device transitions from the first operative state to a second operative state.

20 Claims, 5 Drawing Sheets

INDIRECTLY CONTROLLING A TARGET DEVICE ON A NETWORK

BACKGROUND

1. Field of the Invention

The present invention relates generally to network systems, and more particularly, to indirectly controlling target devices on a network.

2. Related Art

Automatic deployment systems automatically deploy operating systems, application-level software and other software to single or multiple target devices in a network, facilitating the enhancement of a large number of target devices from a centralized location. Automatic deployment systems are typically provided in managed system deployment solutions such as the Radia® OS Manager commercially available from Hewlett-Packard, Automated Deployment Services (ADS) commercially available from Microsoft, the Rapid Deployment Pack commercially available from Altiris, Kickstart commercially available from Red Hat, and Jumpstart commercially available from Sun Microsystems.

Conventional automatic deployment systems implement a set of operations or steps to advance target device(s) from an initial state through various intermediate goal states and, ultimately, to a final goal state in which the target device(s) is/are operational and ready for use. This typically involves well-defined goal states and operations being carried out on the target device and recorded in the deployment system to guide the centralized management of the target device from initial to goal state.

It sometimes becomes necessary to carry out an operation that is not included in the normal, well-defined and well-known initial and goal state operations. Such exceptional operations may be required to be carried out either as a temporary substitute for a standard operation or as an operation to be performed in addition to the standard operations. An example of such an exceptional operation could be a software recovery operation for a hardware failure, such as a RAID volume rebuild. Current systems, however, do not efficiently handle such exceptional operations, often requiring personnel to manually make the desired changes on individual target devices.

SUMMARY

In accordance with one aspect of the present invention, a method for enabling a manager to indirectly control a target device is disclosed, the method comprising: transitioning a target device directly controllable by the manager to a first operative state; receiving, by the directly-controllable target device, a set of one or more instructions; processing, by the directly-controllable target device, the set of one or more instructions while in the first operative state to cause the indirectly-controllable target device to perform a set of one or more operations; and transitioning the directly-controllable target device from the first operative state to a second operative state after processing of the set of one or more instructions.

In accordance with another aspect of the present invention, a system for enabling a manager to indirectly control a target device is disclosed, the system comprising: the target device; and a target device directly-controllable by the manager and configured to transition to a first operative state and while in the first operative state, to process a received set of one or more instructions to cause the indirectly-controllable target device to perform a set of one or more operations, and wherein the directly-controllable target device is further configured to transition to a second operative state after processing of the one or more instructions.

DETAILED DESCRIPTION

Figure 1:
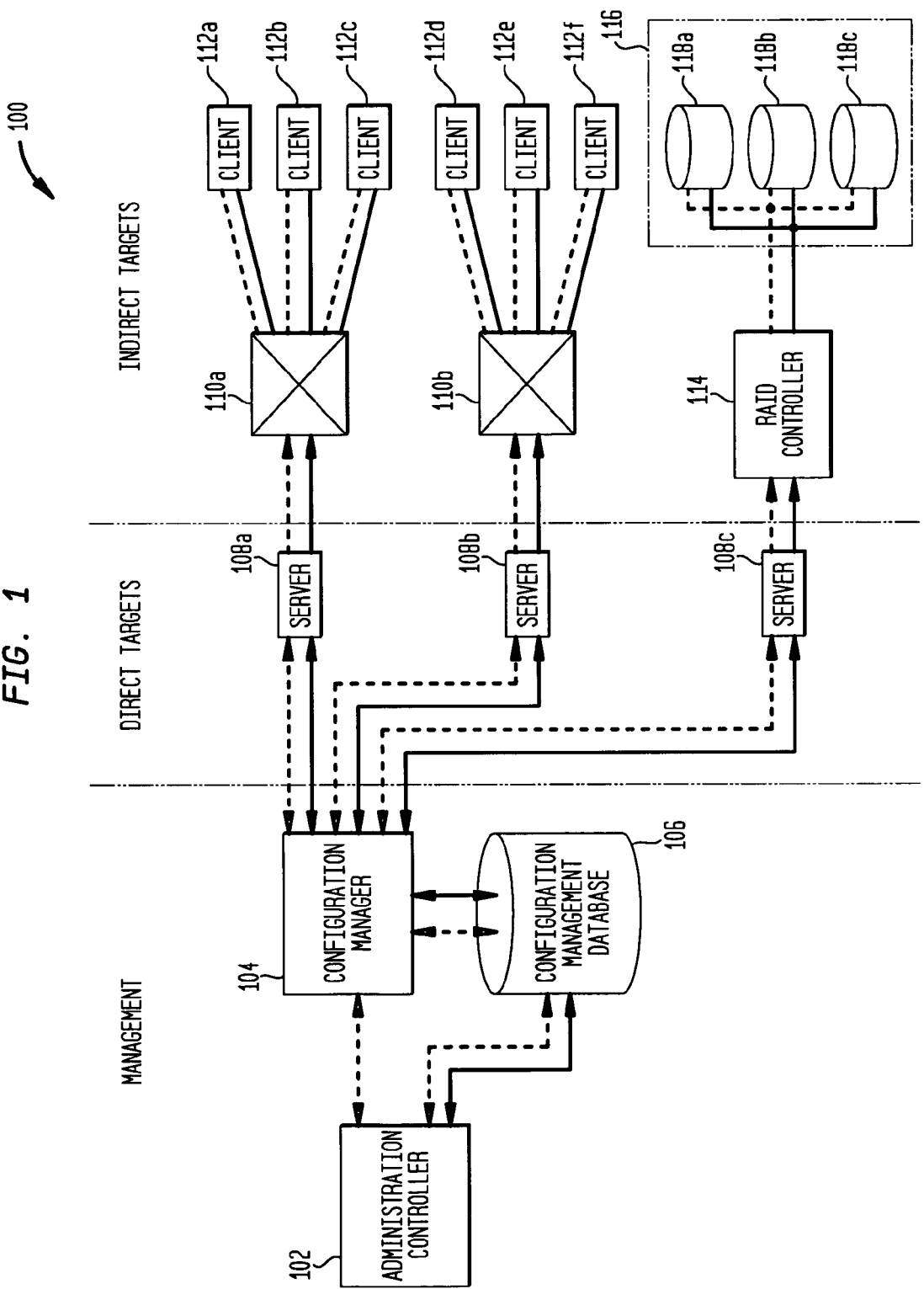
FIG. 1 illustrates an exemplary network, in accordance with one embodiment of the present invention.

FIG. 1 illustrates one embodiment of a network in accordance with one aspect of the invention. Network 100 comprises an administration controller 102, a configuration manager 104, a configuration manager database 106, a plurality of servers 108a-108c (collectively and generally referred to herein as server or servers 108), switches 110a and 110b, a plurality of clients 112a-112f, a Redundant Array of Independent (or Inexpensive) Disks (RAID) controller 114, and a storage system 116 including a plurality of storage devices 118a-118c. In an embodiment, network 100 implements an automatic deployment system (ADS), such as, for example, the Radia® OS Manager commercially available from Hewlett-Packard.

Administration controller 102 may be any type of processor-based system, such as a computer. Administration controller 102 may include a processor, memory and storage along with software for execution by the processor that permits an administrator to perform management and control operations on network 100. It should be appreciated that embodiments of administration controller 102 also comprise appropriate user interface and data entry components and systems such as a keyboard, mouse, a display and the like.

Configuration manager 104 may be any type of processor-based system, such as a server. Configuration manager 104 preferably executes software capable of receiving management commands from administration controller 102 and generating packages of data and instructions for execution by target devices 108, 110, 112 and 118. These data packages and target devices are described in greater detail below.

Configuration manager 104 is further capable of executing control and storing/receiving information to/from a configuration management database 106 that stores information for use in the management of network 100. Administration controller 102 is also preferably capable of executing control over and storing information in or retrieving information from configuration management database 106. For ease in explanation, control communications are illustrated in FIG. 1 as dotted lines while the exchange of data (i.e., information) is illustrated by solid lines. Additionally, the illustrated arrows are for explanatory purposes and in actual applications all, a subset, or other communications may be bi-directional between the various illustrated components.

As shown in FIG. 1, servers 108a-108b are connected to configuration manager 104. In this illustrative implementation, servers 108 are configured to be directly controlled by configuration manager 104. As such, servers 108 are an exemplary implementation of a directly-controllable target device, also referred to herein as a direct target devices. As used herein, a direct target device is a device capable of being directly controlled by configuration manager 104. Although in FIG. 1 all the illustrated target devices are servers, it should be understood that in other applications directly-controllable target devices may be other types of devices such as, for example, computers, laptops, personal data assistants, cell phones, or any other type of device capable of being directly controlled by configuration manager 104.

As shown in FIG. 1, servers 108a and 108b are connected to switches 110a and 110b that are, in turn, connected to a plurality of clients 112a-112c and 112d-112f, respectively. Switches 110a and 100b may be any type of switch, such as, for example, an Ethernet switch. Clients 112a-112f may be any type of device, such as, for example, computers, laptops, power control devices, etc. Server 108c is connected to RAID controller 114 capable of controlling storage system 116 that includes a plurality of storage devices 118a-118c. RAID controller 114 and storage devices 118 may be any type of device such as those commonly used in RAID storage systems.

Switches 110, clients 112, RAID controller 114, and storage devices 118 are devices which are not capable of being directly controlled by configuration manager 104 but which a target device may exercise control over. Therefore, such devices are referred to herein as indirectly-controllable target devices, indirect target devices or, more simply, as indirect targets. Thus, as used herein an "indirect target" is a device not capable of being directly controlled by configuration manager 104 but which a direct target device may exercise control over. Although, FIG. 1 only illustrates a limited type of indirect targets, in other embodiments other indirect targets may be used, such as, for example, computers, laptops, power control switches, or any type of device configured to be controlled by a target device by not directly controllable by configuration manager 104. A more detailed description of an exemplary method by which configuration manager 104 may exercise control over an indirect target is presented below.

Figure 2:
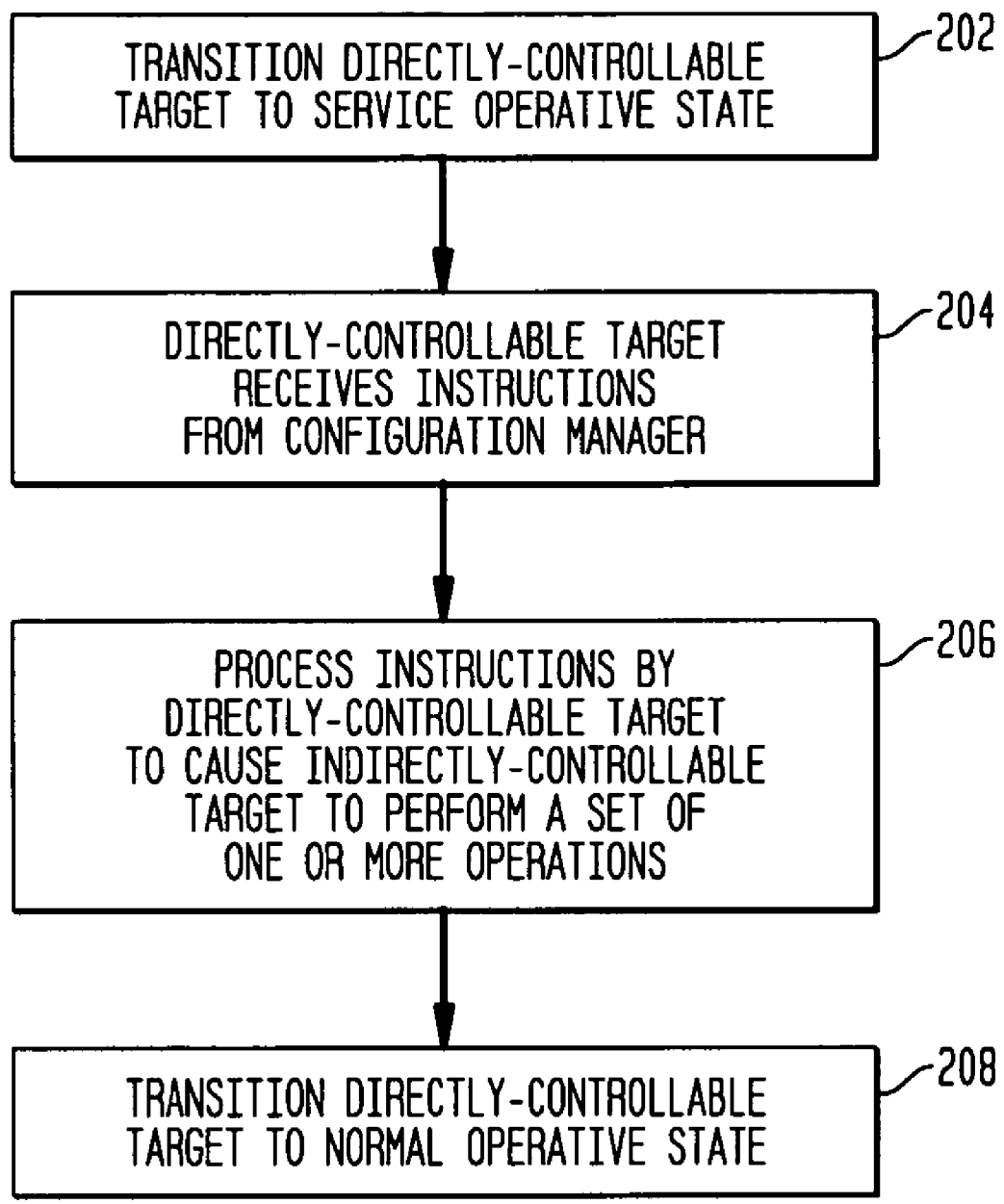
FIG. 2 illustrates a simplified flow chart of a method for indirectly controlling a target device in accordance with one embodiment of the present invention.

FIG. 2 illustrates a simplified flow chart of a method for controlling an indirect target device, in accordance with one embodiment of the present invention. As illustrated, the direct target device (e.g., a server 108) transitions to a first operative state at step 202. As used herein, the term "operative state" refers to a state of a device in which the device executes a particular operating system (OS) or a particular mode of an OS. In the presently described embodiment, the target device transitions at step 202 to a service operative state. This service operative state may be, for example, a state in which the direct target device executes a service Operating System (OS). As used herein, the term "service OS" refers to an operating system and environment capable of supporting operations for causing state transitions in another target device. For example, a service OS may be a small, purpose-built operating system and environment specifically designed to support the operations required to transition a target device from an initial state to a goal state. This service OS may be, for example, a small network booted Linux OS, a simple network booted OS environment or a small subset of a Windows OS. A more detailed example of an exemplary method for transitioning a target device to a service operative state is presented below with reference to FIG. 3.

Next, the direct target device (e.g. a server 108), while in the service operative state, receives a set of one or more instructions at block 204. In the presently described embodiment, these instructions are received from configuration manager 104. It should be appreciated, however, that any management system or software on the network may provide such instructions. A more detailed description of an exemplary embodiment for obtaining these instructions is presented below with reference to FIG. 3.

The target device, while still in the service operative state, then processes the received instructions at block 206. In the presently described embodiment, the processing of these instructions by the direct target device results in the direct target device directing an indirect target device (e.g., raid controller 114 or a switch 110) to perform a set of one or more operations. If the indirect target device is RAID controller 114, these operations may, for example, direct RAID controller to perform a RAID volume rebuild. Or, for example, if the indirect target is a switch 110, the operations may cause the switch to set up or delete connections between various clients 112. Further descriptions of exemplary operations that a target device may direct an indirect target device to perform are described in further detail below.

After the target device processes the received instructions, the target device then transitions to a second operative state at block 208. In the presently described embodiment, the target device transitions to a normal operative state in which the target device is in a normal mode of operations. As used herein, normal mode of operations refers to a state of the target device in which the device is deployed with a functioning operating system and installed applications that make it readily usable for its intended purpose. Normal operations performed by server 108 may include, for example, email or web serving, management and control of a database, a transaction processing system for a retail store, a system for tracking inventory, etc.

Figure 3:
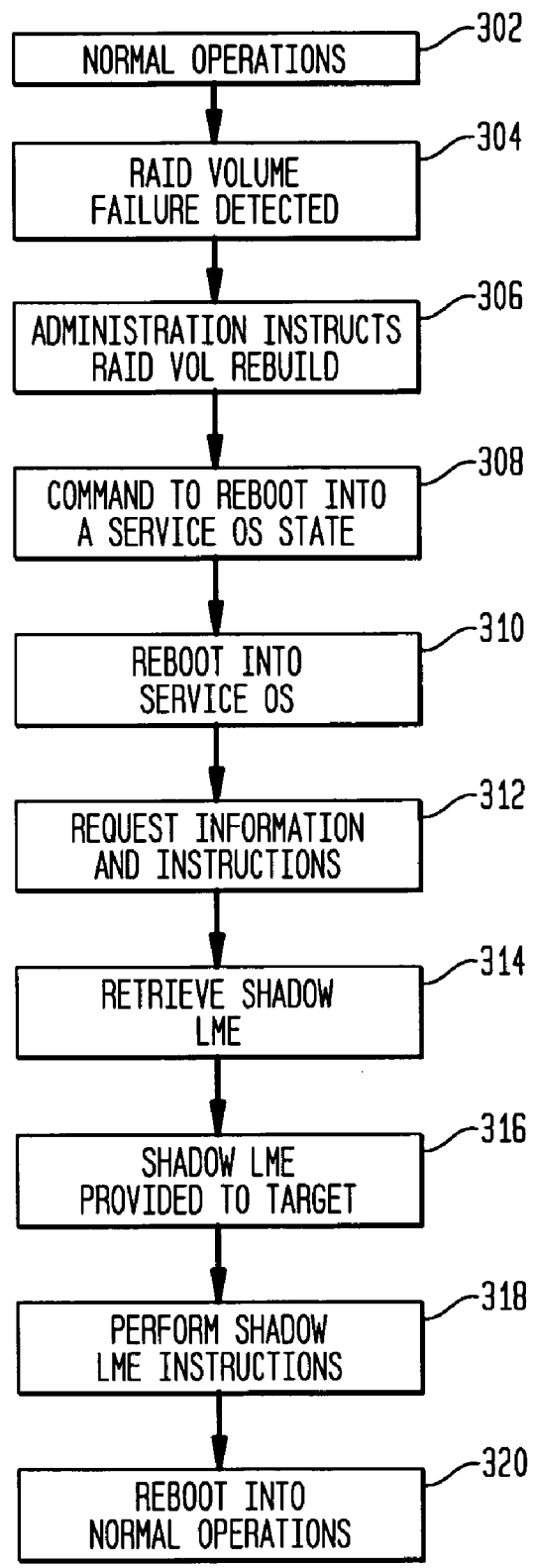
FIG. 3 is a flow chart of the operations performed by an exemplary mechanism for indirectly controlling a target device in accordance with one embodiment of the present invention.

FIG. 3 illustrates more detailed exemplary flow chart of an exemplary mechanism for directing an indirect target to perform an operation. FIG. 3 will be described with reference to the above-discussed network of FIG. 1. In the embodiment of FIG. 3, server 108c (i.e., the direct target device) will be used to direct RAID controller 114 (i.e., the indirect target device) to perform a RAID volume rebuild.

Initially, server 108c and system 100 are in a desired operative state of normal mode of operations at block 302. As noted above, as used herein, normal mode of operations refers to a state of the direct target device in which the device is deployed with a functioning operating system and installed applications that make it readily usable for its intended purpose. Normal operations performed by server 108c may include, for example, email or web serving, management and control of a database, a transaction processing system for a retail store, a system for tracking inventory, etc. Storage system 116 is operating as a redundant array of independent disks (RAID) storage repository for server 108c, etc. For example, during normal operations, RAID controller 114 may manage one or more physical disks on RAID storage system 116. As is known to those of ordinary skill in the art, a RAID volume may comprise two or more physical drives first organized as a reliable raw storage area and further divided up into logical volumes usable by the OS and its applications. As is known to those of ordinary skill in the art, a RAID volume may be comprised of a plurality of the physical disks 118a, 118b and 118c. For this description the single RAID volume comprised of this multiple of physical disks 118a-118c is the storage that spans multiple storage devices 118. Administration controller 102, in this example, maintains a state machine for tracking the state of the system, which at block 302 is the desired state of normal operations.

At some point a RAID volume may fail. This failure is detected at block 304 by RAID controller 114, which then provides notice to administration controller 102 via server 108c and configuration manager 104.

Administration controller 102, at block 306, then sends an instruction to configuration manager 104 to institute a rebuild of the failed RAID volume. Administration controller 102 need not change the state of server 108c in the state machine nor track whether the RAID rebuild was successful. Instead, in the current embodiment, administration controller 102 simply invokes the operation. That is, in this example, administration controller 102 transmits the instruction to rebuild the failed RAID volume and then discards the information associated with its receipt of the notice that the RAID volume had failed. Instead, it simply treats server 108c as though it has stayed in the desired state of normal operations.

At block 308, configuration manager 104 instructs server 108c to reboot into a service operative state, e.g., a service Operating System (OS) state. In response, server 108c reboots so that it is executing a service OS at block 310. As noted above, this service OS may be, for example, a small network booted Linux OS, a simple network booted OS environment or a small subset of a Windows OS. Server 108c then sends a request to configuration manager 104 requesting information and instructions for its operations at block 312.

Then, at block 314, configuration manager 104 retrieves information for forwarding to server 108c. This information may include both low-level managed elements (LMEs) or operations that can be applied to the direct target device itself and that may be reflected in the state transitions of the direct target device from initial to goal state and/or "shadow" LMEs or operations to be applied to devices controlled by the target device but that are not or cannot be managed or controlled by the management system; that is, indirect target devices. As used herein, an LME or shadow LME is package of instructions and data that are to be executed by a target (i.e., in this example server 108c) to cause the direct target to perform some functions related to itself or functions related to an indirect device which may be controlled by the direct target. An LME may be entirely abstract regarding the target, the time, and other LMEs. These instructions may include information regarding about how it is to be applied (e.g., what tools (software), resource files, configuration files, etc. to use), along with any requirements the LME might have. An exemplary LME might be a package of instructions and data for use in upgrading server 108's motherboard firmware. In such an example, the LME might comprise both the updated firmware and the instructions necessary for server 108 to update the firmware. For simplicity, in this example, configuration manager 104 does not retrieve an LME, however, in other examples; one or more LMEs may be retrieved for server 108c.

As noted above, configuration manager 104 may also provide server 108c with one or more shadow LMEs. A shadow LME is an LME directed not toward a direct target but instead towards an indirect target. As noted above, an indirect target is a device not directly accessible by configuration manager 104. Rather, an indirect target is only accessibly by configuration manager 104 through a target device.

In this example, RAID controller 114 is an indirect target and configuration manager 104 has been directed to cause RAID controller 114 to perform a RAID volume rebuild. As such, in this example, configuration manager 104 creates a shadow LME for performing this rebuild RAID volume operation. This shadow LME preferably is a package of data and instructions for use by server 108 in directing RAID controller 114 to perform the RAID volume rebuild. Thus, this shadow LME may include, for example, identifiers for the storage device(s) that are to comprise the RAID volume, any login information for accessing RAID controller 114 (if needed), along with any other type of information necessary for instituting a RAID volume rebuild. As noted above, configuration manager 104 may obtain the data and instructions for this shadow LME from configuration management database 106.

Configuration manager 104 then provides the LMEs and shadow LMEs to server 108 at block 316. In this example, no LMEs and only a single shadow LME regarding a RAID volume rebuild are provided to server 108c. Configuration manager 104 may provide this shadow LME in a "fire and forget" manner. That is, it provides the shadow LME to server 108 and need not track whether the RAID volume rebuild was successful.

Server 108c then executes the LMEs and shadow LMEs at step 318. Thus, in this example, server 108c receives the shadow LME regarding rebuilding the RAID volume and accordingly forwards instructions and data to RAID controller 114 directing RAID controller 114 to perform the RAID volume rebuild. Server 108 may either provide these instructions and data to RAID controller 114 in a fire and forget manner, or it may track whether the rebuild was successful.

After performance of the shadow LME (e.g., the RAID volume rebuild), server 108c reboots back into an operative state of normal operations at block 320. That is, server 108c reboots into a normal operating state where it again performs its normal operations. As noted above, these normal operations may include, for example, email, web serving or transaction processing that utilizes the storage system 116 for its data repository.

In the presently described example of a RAID volume rebuild, this operation (i.e., the RAID volume rebuild) does not alter the state of the system. That is, prior to the RAID volume failure, the system was operating in the desired state of normal operations. This state is not changed during the RAID volume rebuild and after configuration manager 104 forwards the shadow LME to server 108c, configuration manager 104 and administration controller 102 continue to view the system 100 and server 108c as being in the desired state of normal operations. Thus, the presently described shadow LME (i.e., the RAID volume rebuild) is simply a mechanism for implementing a temporary operation to bring the system back to a well-known, well-defined point in the systems state machine (e.g., the state of normal mode of operations).

Figure 4:
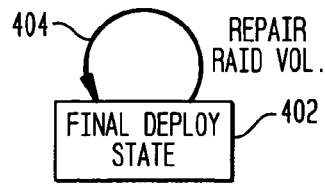
FIG. 4 illustrates an exemplary state diagram for the operations of the flow chart of FIG. 3, in accordance with one embodiment of the present invention.

FIG. 4 illustrates an exemplary state diagram for the operations of the flow chart of FIG. 3, in accordance with one embodiment of the invention. As noted above, administration controller 102 may maintain a state machine for system 100. Prior to failure of the RAID volume, system 100 is in the desired state of Final Deploy State 402. After failure of the RAID volume, a shadow LME is used to perform a temporary operation 404 of a RAID volume rebuild. After performance of this RAID volume rebuild, system 100 remains in the desired state of Final Deploy State 402. As such, the performance of this shadow LME was stateless (i.e., it had no impact on the state of this maintained in the state machine).

In addition to using a shadow LME when the system is in a desired state of Final Deploy State, shadow LME's may also be used during other states or during transitions between states. For example, shadow LMEs may be used during activating of a target device, such as, for example, when it becomes necessary to carry out an operation that may be outside the normal set of operations. These exceptional operations are not part of the operations generally required to bring a system to a final (ready-to-use) state. Further, these exceptional operations may not replace a state in the sequence of operations. Rather, they may be used as a temporary substitute for a typical operation or step in moving a target to its next goal state. An example of such an operation could be a software recovery for a hardware failure (e.g., a RAID volume rebuild) that occurs after the system has been running and functioning in a production environment. Further, in such examples, an administrator via administration controller 102, as in the above example, may manage, oversee, and control system 100, including the performance of this operation outside the normal set of operations.

As noted above, shadow LMEs are temporary operations that are not intended to cause a change in operation of the state machine (e.g., a state machine for deploying targets). On the contrary, a shadow LME is preferably a temporary operation that brings the target device back to a defined point in the state machine. Once the machine has been returned to a known state in the state machine, administration controller 102 and configuration manager 104 may resume progress towards the direct target device's goal state. Additionally, during performance of the shadow LME, one ore more operations of the state machine may be temporarily bypassed, re-routed, inserted, or overlaid onto the state machine in order to bring the system back into compliance with one of the state of the state machine (e.g. a state machine for deploying targets).

Figure 5:
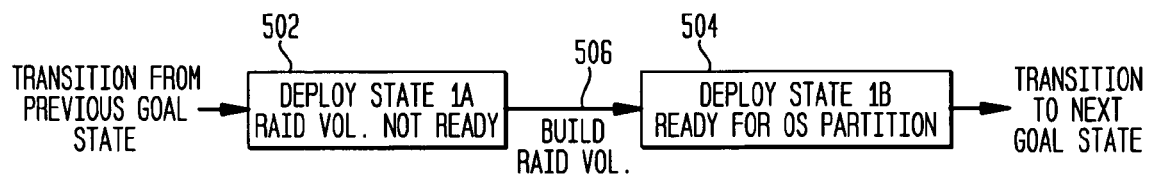
FIG. 5 illustrates a subset of a typical state machine for deploying targets.

FIG. 5 illustrates a subset of a typical state machine for deploying targets, in accordance with one embodiment of the present invention. Two states of the state machine are illustrated in FIG. 5: a deploy state 1A (state 502) and a deploy state 1B (state 504). Prior to transitioning to deploy state 1A 502, the state machine may be in a previous goal state, such as, for example, an initial state for setting up a RAID volume, a state for partitioning the storage drives for the RAID volume, a state for updating the firmware for RAID controller 114, etc. During deploy state 1A 502, the RAID volume is not ready. Next, a standard state operation for Building the RAID volume 506 is performed (referred to herein as "Build RAID volume"), which in typical operations transitions the state machine to deploy state 1B 504 at which point the system is ready for an OS partition. Next, the state machine may transition to a next goal state. Such an exemplary transition and goal state may include an operation regarding installing the OS and a next goal state indicating that the OS is installed and ready to boot.

As noted above, sometimes problems may arise which require an operation outside the typical operations. For example, in the above example of FIG. 5, the RAID volume may partially fail after deployment, but a complete build is not required. Rather, only a partial rebuild and repair operation may be necessary. Further, in such an example, performance of the typical full build of the RAID volume 506 operation might undesirably destroy stored data.

Figure 6A:
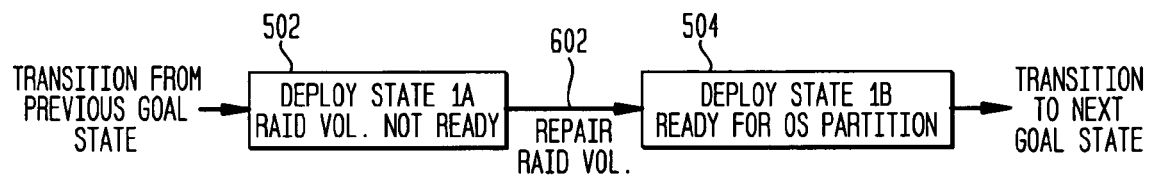
FIGS. 6A and 6B illustrates the portion of the state machine illustrated in FIG. 5 in which an exceptional operation is performed, in accordance with embodiments of the present invention.
Figure 6B:
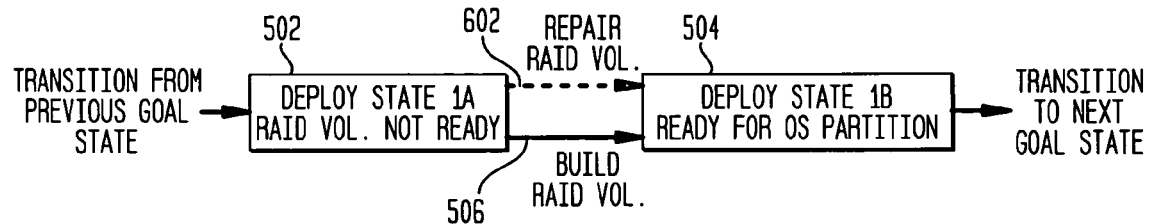

FIGS. 6A and 6B illustrate a subset of a state machine for deploying targets in which a non-typical operation is performed in accordance with one embodiment of the present invention. As shown in FIG. 6A, during the transition from deploy state 1A 502 to deploy state 1B, a shadow LME for repairing a RAID volume 602 is performed rather than performance of a full build of a RAID volume 506 as in the typical operation of FIG. 5. Thus, in this example, for the target, the Build Raid volume 506 operation is temporarily overridden by a shadow repair RAID volume 602 operation.

It should be noted that this is a simplified diagram, and in actual or other implementations, the state transitioned to deploy state 1A 502 may or may not be deploy state 1B 504. For example, deploy state 1B may already be satisfied (e.g., the OS system was already installed and as such it is not necessary to reinstall the OS), such as, for example, due to a previous deployment. Thus, in such an example, deploy state 1A might transition to another goal state (e.g., a state indicating that the OS is installed and ready to boot), rather than transitioning to deploy state 1B 504.

Upon successful completion of the shadow LME for repairing the RAID volume 602 (or simply upon administration controller 102 and configuration manager 104 providing the shadow LME to server 108 in a fire and forget implementation), the state machine may be modified to remove the repair RAID volume 602 transition from itself and restore the permanent operation of "Build RAID volume" 506 as the transition operation from deploy state 1A 502 to deploy state 1B 504. For example, as illustrated in FIG. 6B, the repair RAID volume 602 operation is removed from the state machine (or, for example, never entered into the state machine) as indicated by the dotted line between deploy state 1A 502 and deploy state 1B 504. Instead, the typical operation of "Build RAID volume" 506 is entered into the state machine, as indicated by the solid line between deploy state 1A 502 and deploy state 1B 504. Thus, the state machine will appear as though no abnormal conditions occurred. That is, the state machine will appear identical to the typical state machine, as illustrated by FIG. 5.

Figure 7:
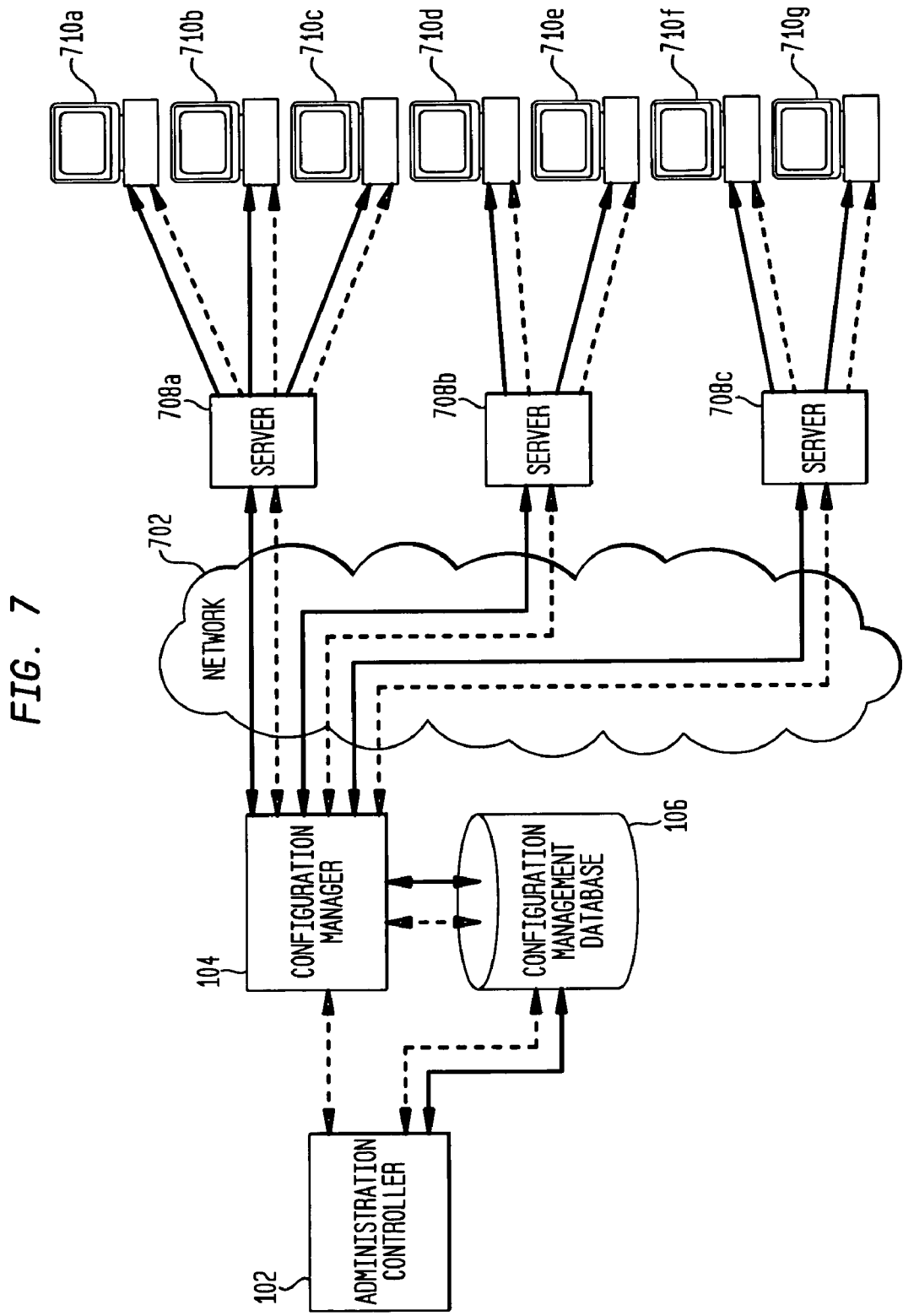
FIG. 7 illustrates an exemplary network, in accordance with one embodiment of the present invention.

The shadow LME for repairing a RAID volume 602 discussed with reference to FIGS. 6 and 7 may utilize the same or similar steps to those discussed above with reference to FIGS. 2 and 3. That is, the administration controller 502 and/or configuration controller 504 may provide the shadow LME to server 108 in a fire and forget manner. That is, the shadow LME is provided to server 108 for performance on an indirect target, RAID controller 114, and neither administration controller 502 nor configuration controller 504 track whether the RAID volume rebuild 506 was successful.

Although the presently described embodiments were discussed with reference to repairing a RAID volume, other types of shadow LMEs are possible without departing from the scope of the invention. For example, returning to FIG. 1, in another example, it may become necessary (or desirable) for an administrator to direct switch 110a to modify its connections (e.g., provide switching functions for a different subset of clients). In such an example, configuration manager 104 may create a shadow LME for altering the switch configuration by retrieving from configuration management database 106 the IP addresses for the clients to be switched along with an IP address and logon information for switch 110a. Configuration manager 104 may then direct server 108a to reboot into the service OS state. Server 108a may then receive the shadow LME from configuration manager 104 and accordingly reconfigure switch 110a. After which, server 108a reboots back into its normal state of operations where it may, for example, function as a standard server. In such an example, configuration manager 104 may provide the shadow LME to server 108 in a fire and forget manner.

Further, in yet other examples, shadow LMEs may be used to direct other programmable or otherwise configurable systems to perform functions outside their normal set of functions related to indirect targets. FIG. 7 illustrates an exemplary network, in accordance with an aspect of the invention. As illustrated, configuration manager 104 is connected to servers 708 via a network 702. As shown, servers 708 are in turn connected to cash registers 710. Network 702 may be any type of network, such as, for example, a LAN, a MAN, a WAN, or the Internet. During normal operations, servers 708 are direct targets and configured to communicate with configuration manager 104 via network 702. Cash registers 710 are indirect targets.

In an example, at some point, it may be necessary (or desirable) to update the firmware of cash registers 710. In such an example, an administrator via administration controller 102 may direct configuration manager 104 to create a shadow LME for performing the firmware update. Configuration manager 104 may then retrieve the data and instructions (e.g., the firmware update and instructions for installation) for the shadow LME from configuration management database 106. This firmware update and its installation instructions may be stored in configuration management database 106 by the administrator using administration controller 102.

As described above with reference to FIG. 3, servers 708 may initially be operating in a normal mode of operations performing normal operations. These normal operations may include functioning as a standard server for a store, where servers 708 may, for example, keep track of inventory, cash in the store, along with, for example other financials for the store. Configuration manager 104 may then direct servers 708 to reboot into the service OS environment. Configuration manager 104 may then provide the shadow LME to servers 708 in a fire and forget manner. Servers 708 may then accordingly update the firmware on cash registers 710. After which, servers 708 may then reboot back into their normal operations. As with the above-discussed examples, after performance of the shadow LME, its performance has not impacted the overall state machine for the system. In this example as in other instances, the direct target device temporarily becomes an element of the management system by carrying out operations to configure or manage devices that are not or cannot be directly managed by the management system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for enabling a manager to indirectly control a target device the method comprising:
    transitioning g a directly-controllable target device that is directly controllable by the manager to a first operative state, wherein transitioning includes rebooting the directly-controllable target device to load a service Operating System (OS);
    receiving, by the directly-controllable target device, a set of one or more instructions;
    processing, by the directly-controllable target device, the set of one or more instructions while in the first operative state to cause the indirectly-controllable target device to perform a set of one or more operations; and
    transitioning the directly-controllable target device from the first operative state to a second operative state after processing of the set of one or more instructions, wherein transitioning to a second operative state includes rebooting the directly-controllable target device to load a different operating system (OS).

2. The method of claim 1, wherein the second operative state is a state in which the directly-controllable target device executes a normal mode of operations.

3. The method of claim 1, further comprising:
    retrieving from storage information related to the set of one or more instructions.

4. The method of claim 1, wherein the transitioning of the directly-controllable target device to the first operative state and the performance of the set of one or more operations is initiated by an administrator.

5. The method of claim 1, further comprising:
    maintaining a state machine comprising one or more goal states; and
    wherein the state machine remains in one of the state machine's goal states during the performance of the set of one or more operations.

6. The method of claim 1, wherein the performance of the set of one or more operations transitions the state machine from a first goal state to a second goal state.

7. A system for enabling a manager to indirectly control a target device comprising:
    the target device; and
    a target device directly-controllable by the manager and configured to transition to a first operative state, wherein the transition to the first operative state includes rebooting the directly-controllable target device to load a service operating system (OS), and while in the first operative state, to process a received set of one or more instructions to cause the indirectly-controllable target device to perform a set of one or more operations, and wherein the directly-controllable target device is further configured to transition to a second operative state after processing of the one or more instructions, wherein transitioning to a second operative state includes rebooting the directly-controllable target device to load a different operating system (OS).

8. The system of claim 7, wherein the second operative state is a state in which the direct target device executes a normal mode of operations.

9. The system of claim 7, further comprising:
    a configuration manager database configured to store information related to the set of one or more instructions.

10. The system of claim 7, further comprising: an administration controller configured to enable an administrator to initiate the transition of the direct target device to the first operative state so that it may receive and process the set of one or more instructions.

11. The system of claim 10, wherein the administration controller is further configured to:
    maintain a state machine comprising one or more goal states; and
    wherein the state machine remains in one of the state machine's goal states during the performance of the set of one or more operations.

12. The system of claim 11, wherein the performance of the set of one or more operations transitions the state machine from a first goal state to a second goal state.

13. A system controlling an indirect target device, comprising:
    an indirect target device; and a direct target device comprising:
        means for transitioning the direct target device to a first operative state,
        wherein transitioning the direct target device includes rebooting the direct target device to load a service operating system (OS);
        means for receiving a set of one or more instructions;

means for processing the set of one or more instructions while in the first operative state to cause the indirect target device to perform a set of one or more operations; and means for transitioning the direct target device from the first operative state to a second operative state after processing of the set of one or more instructions, wherein transitioning to a second operative state includes rebooting the directly-controllable target device to load a different operating system (OS).

14. The system of claim 13, wherein the second operative state is a state in which the indirect target device executes a normal mode of operations.

15. The system of claim 13, further comprising:
means for retrieving information related to the set of one or more instructions from storage.

16. The system of claim 13, further comprising: means for enabling an administrator to initiate the transitioning of the direct target device to the first operative step and the performance of the set of one or more operations.

17. The system of claim 13, further comprising:
means for maintaining a state machine comprising one or more goal states; and wherein the state machine remains in one of the state machine's goal states during the performance of the set of one or more operations.

18. The method of claim 3, further comprising providing the set of one or more instructions and the retrieved information to the directly-controllable target device.

19. The system of claim 9, further comprising a configuration manager configured to retrieve the information related to the set of one or more instructions from the configuration manager database and provide the set of one or more instructions and the retrieved information to the indirect target device.

20. The system of claim 15, further comprising means for providing the set of one or more instructions and the retrieved information to the direct target device.

\* \* \* \* \*

UNITED STATES PATENT AND TRADEMARK OFFICE
CERTIFICATE OF CORRECTION

| | |
|---|---|
| PATENT NO. | : 7,451,246 B2 |
| APPLICATION NO. | : 11/406242 |
| DATED | : November 11, 2008 |
| INVENTOR(S) | : Timothy G Barry et al. |

Page 1 of 1

It is certified that error appears in the above-identified patent and that said Letters Patent is hereby corrected as shown below:

In column 9, line 47, in Claim 1, after "transitioning" delete "g".

Signed and Sealed this

Fourth Day of August, 2009

JOHN DOLL
*Acting Director of the United States Patent and Trademark Office*